United States Patent

[11] 3,625,915

[72] Inventors  Michel Gubler
                Meurchin;
                Joseph Guillon, Henin-Lietard, both of
                France
[21] Appl. No.  704,241
[22] Filed      Feb. 9, 1968
[45] Patented   Dec. 7, 1971
[73] Assignee   Societe Monsanto
                Paris, France
[32] Priority   Feb. 17, 1967
[33]            Great Britain
[31]            7,752/67

[54] ANTISTATIC STYRENE/ACRYLONITRILE-TYPE INTERPOLYMER COMPOSITIONS
     11 Claims, No Drawings

[52] U.S. Cl........................................................ 260/41 R,
        252/8.8, 260/28.5 B, 260/28.5 R, 260/33.4 R,
        260/41.5 R, 260/80.7, 260/85.5 HC, 260/876 R,
        260/880 R, 260/893, 260/898, 260/DIG. 15,
        260/DIG. 17, 260/DIG. 19
[51] Int. Cl......................................................... C08f 19/18,
        C08f 41/12, C08f 45/02

[50] Field of Search............................................ 260/876,
        898, 893, 33.4, 41

[56]            References Cited
            UNITED STATES PATENTS
3,450,794   6/1969   Ebneth et al..................   260/876
3,354,108   11/1967  Paradis et al. ................   260/876
            FOREIGN PATENTS
1,089,810   11/1967  Great Britain................   260/DIG. 16
  820,541   9/1959   Great Britain................   260/DIG. 16
1,139,315   2/1957   France ........................   260/DIG. 16

Primary Examiner—Murray Tillman
Assistant Examiner—H. Roberts
Attorneys—John W. Klooster, Arthur E. Hoffman and Herbert B. Roberts ABSTRACT: The electrostatic properties characteristically associated with styrene/acrylonitrile-type interpolymers is greatly reduced by blending with such polymers a combination of certain alkanolamines and certain polyalkylene glycols.

ANTISTATIC STYRENE/ACRYLONITRILE-TYPE INTERPOLYMER COMPOSITIONS

BACKGROUND

Thermoplastic polymers characteristically tend to accumulate electrostatic charges when rubbed or touched and this can be a disadvantage in many use applications. For example, the presence of electrostatic charges not only causes dust to adhere to a molded article but also causes sheets of thermoplastic polymers to adhere to one another in processing machinery. Furthermore, sparks caused by such charges can also represent a fire hazard in certain circumstances, for example, in hospital operating theatres, or in aircraft.

It has been proposed to incorporate known additives into thermoplastic polymers in order to impart antistatic properties thereto, and although such additives appear to be satisfactory for some thermoplastic polymers, for example, in polyethylene, such additives are generally unsatisfactory (i.e., they give poor antistatic properties) in interpolymer systems of monovinyl aromatic compound and alkene nitrile. For example, it has been found that many known additives which give excellent antistatic properties in polyethylene or in polystyrene are of little value in such interpolymer systems being either completely ineffective, or effective only when used in such large quantities as to have adverse effects on the physical properties of such interpolymers.

It has now been unexpectedly discovered, however, that excellent antistatic properties can be imparted to such interpolymer systems by blending therewith a certain combination of two materials. One of these materials is a class of certain alkanolamines and the other is a class of certain polyalkylene glycols. When blended in minor amounts with such interpolymers, this combination not only gives to the resulting compositions surprisingly good antistatic properties, but also gives thereto surprisingly good prolongation of antistatic properties. The reasons for such improvements are obscure, but it is theorized that (and there is no intent to be bound herein by this theory) the polyalkylene glycol coacts with the amine in a sort of synergistic manner to produce these observed improvements in antistatic properties. The polyalkylene glycol may enhance or prolong the antistatic action of the amine.

SUMMARY

This invention relates to an antistatic thermoplastic polymer composition comprising an interpolymer system of monovinyl aromatic compound and alkene nitrile blended with a combination of both:

a. at least one amine of the formula:

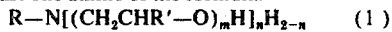

$$R-N[(CH_2CHR'-O)_mH]_nH_{2-n} \quad (1)$$

where,

R is a monovalent aliphatic hydrocarbon group containing from about six through 22 carbon atoms, R' is selected from the group consisting of hydrogen and methyl, m is an integer of from one through eight, n is the integer 1 or 2, and b. at least one polyalkylene glycol having a molecular weight from about 100 through 10,000 which is selected from the group consisting of polyethylene glycol, polypropylene glycol, and mixed polyethylene/polypropylene glycols.

As used herein, the terminology "an interpolymer system of monovinyl aromatic compound and alkene nitrile" has reference to:

a. interpolymers formed by polymerizing a monovinyl aromatic compound with an alkene nitrile compound;

b. interpolymers formed by polymerizing a monovinyl aromatic compound, an alkene nitrile compound, and a conjugated alkadiene monomer;

c. mechanical blends of such interpolymers (a) and/or (b) with a preformed diene polymer rubber produced by polymerizing at least one conjugated alkadiene monomer either by itself (or themselves, as the case may be), or in the presence of either (or both) a monovinyl aromatic compound or an alkene nitrile;

d. graft blends of such interpolymers (a) and/or (b) produced by polymerizing the monomers used to make such interpolymers in the presence of a preformed diene polymer rubber (as characterized in (c) above); and e. mixtures of (a), (b), (c), and/or (d).

Optionally, such an interpolymer system may have chemically incorporated thereinto (as through polymerization) a small quantity, say, less than about 2 weight percent based on total interpolymer system weight, of a divinyl aromatic compound, such as divinylbenzene, or the like. Such interpolymer systems and methods for their preparation are known to the prior art and do not constitute as such a part of the present invention.

Suitable monovinyl aromatic compounds include styrene (preferred); alkyl-substituted styrenes, such as ortho-, meta-, and paramethyl styrenes, 2,4-dimethylstyrene, paraethystyrene, or alpha methyl styrene; halogen substituted styrenes such as ortho-, meta-, and parachlorostyrenes, or bromostyrenes, 2,4-dichlorostyrene; and mixed halogen plus alkyl-substituted styrenes, such as 2-methyl-4-chlorostyrene; vinyl naphthalene; vinyl anthracene; mixtures thereof, and the like. The alkyl substituents generally have less than five carbon atoms, and may include isopropyl and isobutyl groups.

Suitable alkene nitrile compounds include acrylonitrile (preferred), methacrylonitrile, ethacrylonitrile, mixtures thereof, and the like.

Suitable conjugated alkadiene monomers include butadiene, 3-methyl-1,3-butadiene, 2-methyl-1,3butadiene, piperylene chloroprene, mixtures thereof and the like. Conjugated 1,3 dienes are preferred.

Examples of interpolymers (a) include especially copolymers of styrene and acrylonitrile. In interpolymers (a) the amount of chemically combined monovinyl aromatic compound typically ranges from about 20 to 95 weight percent, and preferably from about 50 to 75 weight percent (based on total weight of such interpolymer), while, correspondingly, the amount of chemically combined alkene nitrile typically ranges from about 80 to 5 weight percent, and preferably from about 25 to 10 weight percent.

Examples of interpolymers (b) include especially copolymers of styrene, acrylonitrile, and butadiene. In interpolymers (b), the relative proportions of each of the monovinyl aromatic compound and the alkene nitrile remain as in interpolymers (a), while the amount of chemically combined conjugated alkadiene monomer typically ranges up to about 25 weight percent, and preferably from about 5 to 20 weight percent (based on total weight of such interpolymer).

These interpolymers (a) and (b) may, if desired, contain up to about 7 percent by weight of one or more other copolymerizable ethylenically unsaturated monomers, such as alkyl acrylates (e.g., methyl acrylate, ethyl acrylate, butyl acrylate, octyl acrylate, etc.), the corresponding alkyl methacrylates, unsaturated acids (e.g., acrylic acid, methacrylic acid, etc.), unsaturated amides (e.g., acrylamide, methacrylamide, N-butyl acrylamide, etc.), ar-halostyrenes (e.g., the o-, m-, and p-chlorostyrenes, p-bromostyrene, etc.), dialkyl maleates and fumarates (e.g., the dimethyl, diethyl, dubutyl, and dioctyl maleates and fumarates, etc.), conjugated dienes (e.g., butadiene, isoprene, etc.); and the like. Also, if desired, the interpolymers can contain minor amounts, e.g., about 0.05 to 3 percent by weight of a chain transfer agent, such as a higher alkyl mercaptan, alpha-methylstyrene dimer, etc.

Among the preferred interpolymers are those which consist substantially of about 20 to 85 percent, preferably about 60 to 85 percent, by weight of a combined monovinyl aromatic hydrocarbon and about 80 to 5 percent, preferably about 40 to 15 percent, by weight of combined acrylonitrile and/or methacrylonitrile.

Any interpolymer (a) or (b) employed in addition to the graft copolymer superstrate (see blend (d)) usually has a specific viscosity of about 0.04 to 0.15, preferably about 0.07 to 0.1, measured as a solution of 0.1 percent of the polymer in dimethylformamide at 25° C.

Examples of diene polymer rubbers include, for examples, natural rubber having isoprene linkages, polyisoprene, polybutadiene (preferably one produced using a lithium alkyl or Ziegler catalyst), styrene-butadiene copolymer rubber, butadiene acrylonitrile copolymer rubber, mixtures thereof and the like. In selecting diene rubber polymers for use in this invention, it is preferred to use those having a glass phase or second-order transition temperature below about 0° C. (preferably below about −25° C.) as determined by ASTM Test D–746–52T, and having a Young's Modulus of less than about 40,000 p.s.i.

Such rubbers include homopolymers and interpolymers of conjugated 1,3-dienes with up to an equal amount by weight of one or more copolymerizable monoethylenically unsaturated monomers, such as monovinylidene aromatic hydrocarbons (e.g., styrene; an aralkylstyrene, such as the o-, m- and p-methylstyrenes, 2,4-dimethylstyrene, the arethylstyrenes, p-tert-butylstyrene, etc.; an alpha-alkylstyrene, such as alpha-methylstyrene, alpha-ethylene, alpha-methyl-p-methylstyrene, etc.; vinyl naphthalene, etc.); arhalo monovinylidene aromatic hydrocarbons (e.g., the o-, m-, and p-chlorostyrenes, 2,4-dibromostyrene, 2-methyl-4-chlorostyrene, etc.); acrylonitrile, methacrylonitrile; alkyl acrylates (e.g., methyl acrylate, butyl acrylate, 2-ethylhexyl acrylate, etc.), the corresponding alkyl methacrylates, acrylamides (e.g., acrylamide, methacryl-amide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2.0 percent by weight of a cross-linking agent, based on the weight of the rubber-forming monomer or monomers, cross linking may present problems in dissolving the rubber in the monomers for the graft polymerization reaction. In addition, excessive cross linking can result in loss of the rubbery characteristics. The cross-linking agent can be any of the agents conventionally employed for cross-linking diene rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90.0 to 95.0 percent by weight butadiene and 5.0 to 10.0 percent by weight of acrylonitrile or styrene.

In blends (c) and (d), the total weight percentage of diene polymer rubber present typically ranges up to about 25 weight percent, and preferably from about 5 to 20 weight percent (based on total weight of such a blend). Blends (d) are preferred, and a particularly preferred blend is a graft copolymer of styrene and acrylonitrile on a polybutadiene rubber.

In blends (d), an interpolymer (a) or (b) forms the graft superstrate while the diene polymer rubber forms the graft substrate. Although the amount of interpolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 70–150:100. With graft ratios above 30:100, a highly desirable degree of improvement in various properties generally is obtained.

The interpolymers (a) and (b) may be produced by various known polymerization techniques, such as mass, emulsion, suspension, and combinations thereof. Whatever polymerization process is employed, the temperature, pressure, and catalyst (if used) should be adjusted to control polymerization as to obtain the desired product interpolymer. If so desired, one or more of the monomers may be added in increments during polymerization for the purposes of controlling viscosity and/or molecular weight and/or composition. Moreover, it may be desirable to incorporate low-boiling organic, inert liquid diluents during a mass polymerization reaction to lower the viscosity, particularly when a rubber is employed. Moreover, the catalyst may be added in increments, or different catalysts may be added at the same time or at different points during the reaction. For example, when a combined mass-suspension process is employed, generally oil-soluble catalysts may be employed; and both low- and high-temperature catalysts may be advantageously used in some reactions.

The blends (c) may be prepared by simple, conventional physical intermixing. Conveniently, one uses starting materials in a solid, particulate form, and employs such conventional equipment as a ribbon blender, a Henschel mixer, a Waring blender, or the like.

The blends (d) may be prepared by polymerizing monomers of the interpolymer in the presence of the preformed rubber substrate, generally in accordance with conventional graft polymerization techniques involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time. A preferred method of preparation involves carrying out a partial polymerization in a bulk system with the rubber dissolved in a mixture of the nitrile and vinyl aromatic monomers, followed by completion of the polymerization in an aqueous suspension system.

Blends may be prepared by blending latices of a graft copolymer and an interpolymer and recovering the polymers from the mixed latices by any suitable means, e.g., drum drying, spray drying, coagulating, etc. Preferably they are prepared by simply comalaxating a mixture of the interpolymer and the hydroxylated graft copolymer at an elevated temperature for a period of time sufficient to provide an intimate fusion blend of the polymers. Blends of graft copolymer and interpolymer can be prepared by simply blending the two polymers together on conventional plastics working equipment, such as rubber mills, screw extruders, etc.

As mentioned above, the blends with which the present invention is most desirably employed are those wherein at least a portion of the interpolymer has been prepared in the presence of the diene rubber to cause some chemical combination to occur between the rubber and interpolymer components. Typically, a small amount of the superstrate interpolymer is not in chemical combination with the rubber substrate because of the less-than-100 percent grafting efficiency of conventional graft copolymerization reactions.

In formula (1) amines, the monovalent aliphatic hydrocarbon group R can be straight chain or branched, and although it is preferably an alkyl group, one or more olefinic double bonds can be present. Preferably, the number of carbon atoms in group R is between R and 18. Also, in formula (1), the group R' is preferably hydrogen; $m$ is preferably from one through four, and most preferably is one; and $n$ is preferably two.

Although amines of formula (1) may be used which are substantially pure (that is, only one amine of formula (1) is present), it is preferred to use a mixture of formula (1) amines. A preferred class of mixtures of formula (1) amines are those wherein R is varied so that there are present in the mixture at least two different amines each in excess of about 5 weight percent, based on total weight of formula (1) amines present. In such a mixture, it is preferred that R in different formula (1) amines be both a $C_{18}$ radical and $C_{16}$ radical.

Amines of formula (1) can be prepared by any convenient route and are common items of commerce. A convenient preparation route, especially when preparing the preferred mixtures above described, involves the use of hydrolyzed animal tallow or natural vegetable oils, such as coconut oil. Such oils are largely glycerides of monocarboxylic acids. Thus, particularly common glycerides in such oils are stearin, plamitin, and olein, (this last being a particularly common component of almost all naturally occurring fats as well as tall oil), which when hydrolyzed, yield stearic acid (N-octadecanoic acid), palmitic acid (hexadecanoic acid), and oleic acid (cis-9-octadecenoic acid). From the mixed free carboxylic acids produced by hydrolysis, the corresponding nitriles are formed. These nitriles are then hydrogenated to form the corresponding primary amines. These amines are then conventionally reacted with ethylene oxide and/or propylene oxide to produce a desired formula (1) material.

In such preferred amine mixtures, in addition to being a $C_{18}$ radical, and a $C_{16}$ radical (derived as just indicated from stearic, palmitic and oleic acids), R can be derived from capric, myristic, and lauric acids (the latter being especially common in coconut oil).

Amines of formula (1) are present in the antistatic thermoplastic compositions of this invention in minor amounts of typically less than 30 weight percent (based on total composition weight).

Larger amounts of the amine can be present where the composition is a concentrated one intended as a "master batch" to be diluted with further quantities of copolymer, compared to amounts which are present in compositions ready for consumer usage in the fabrication of articles of manufacture. In such latter compositions, commonly the amount employed is under about 5 weight percent but over about 0.001 weight percent. Preferably in such latter compositions the amount ranges from about 0.5 to 4 weight percent and more preferably from about 1 to 2 weight percent.

Also in the antistatic thermoplastic compositions of this invention, the above-indicated polyalkylene glycols are present in minor amounts of typically less than about 10 weight percent (based on total composition weight), as in "master batches" but it is preferred to add such glycols to the interpolymer system at the time when blends intended for consumer usage are being prepared. In such latter compositions, commonly the amount employed is under about 1 weight percent but over about 0.001 weight percent. Preferably, in such latter compositions, the amount ranges from about 0.1 to 0.8 weight percent and more preferably is from about 0.4 to 0.6 weight percent.

Mixtures of various polyalkylene glycols can be employed, within the molecular weight ranges indicated above. Such glycols as are used herein are readily prepared and are common items of commerce.

The appropriate quantity of the antistatic additives can be incorporated into the copolymer by physical (mechanical) blending under the influence of heat and pressure, for instance, by mixing together the copolymer and the antistatic additives to give a moldable composition, or by introducing the antistatic additives into the reactor in which the copolymer is being produced. The copolymer and the antistatic additives can be mechanically mixed together by a variety of methods and when this procedure is adopted the actual method chosen will depend to some extent on the desired final physical form of the copolymer. For example, the antistatic additives can conveniently be incorporated into the copolymer in a heated mixing machine, such as a Banbury mixer, to give a moldable composition. This can be molded or extruded directly, or it can be extruded in the form of rods which are chopped up into pellets and used in subsequent operations, for instance, in the production of articles by injection or compression molding or the extrusion of for instance a resin sheet. If desired, the antistatic additives can be employed as a concentrated "master batch" in the copolymer. In general, any convenient blending procedure can be used in preparing the compositions of this invention from the starting interpolymer system, the starting formula (1) amine and the starting polyalkylene glycol.

Other minor ingredients can be incorporated into the compositions of this invention if appropriate or if desired, for example, plasticizers, pigments, dyes, antioxidants, stabilizers, and the like without departing from the spirit and scope of this invention.

EMBODIMENTS

The following examples are set forth to illustrate more clearly the principles and practices of this invention to one skilled in the art and they are not intended to be restrictive but merely to be illustrative of the invention herein contained. Unless otherwise stated therein, all parts and percentages are on a weight basis.

EXAMPLE 1

This example describes the antistatic effect on a styrene-butadiene-acrylonitrile graft blend by the addition of mixed N,N-bis(2-hydroxyethyl) alkylamines and various polyols.

Five thousand grams of a graft blend prepared by grafting 66 parts of styrene and 23 parts of acrylonitrile on to 11 parts of polybutadiene rubber are blended in a conical mixer with 2 percent by weight, based on the copolymer, of a commercial mixture of N,N-bis(2-hydroxyethyl) $C_{12}$ to $C_{18}$ alkyl-amines and 0.5 percent by weight, based on the copolymer, of various polyalkylene glycols as noted below to form a series of sample compositions.

The blender is operated for 20 minutes and the resulting mixture in each is then extruded at a temperature of about 200° C. as a solid rod, cooled, and chopped up into pellets. The pellets are injection molded into plaques and the antistatic properties of the plaques are measured and compared with those of plaques made from a control sample which is similarly processed, but without the addition of the N,N-bis(2-hydroxyethyl) alkyl-amine mixture. The plaques, which are 100 millimeters square and 3 millimeters thick, are molded at 245° C. Care was taken to ensure that the plaques produced for testing are not handled other than by the edges since it is found that grease and moisture deposited from the hands can have a large effect on the measured properties. The plaques are washed with petroleum ether, heated in an oven for 24 hours at 50° C., and then allowed to condition in a controlled atmosphere of 23° C., 50 percent relative humidity for at least 24 hours. The surface resistivity of the plaques is then measured using a Keithley 610B electrometer provided with a Keithley 6105 resistivity adapter using the procedure of ASTM standard D257–61.

For the purpose of comparison, similar plaques are molded and tested from resin containing 2 percent by weight of amine alone.

The results obtained were as follows:

| Polyalkylene Glycol | Molecular weight | Surface Resistivity (ohms) |
| --- | --- | --- |
| Polyethylene glycol | 400 | $6.5 \times 10^{12}$ |
| Polypropylene glycol | 1,200 | $4 \times 10^{13}$ |
| Polypropylene glycol | 2,000 | $4 \times 10^{12}$ |

These results show that the antistatic properties of compositions of this invention are comparable to or better than that obtained using the amine alone ($3.5 \times 10^{13}$ ohms), and measurements carried out over a period of several months show that the addition of the polypropylene glycol resulted in a prolongation of the antistatic properties associated with compositions of this invention.

EXAMPLE 2

This example describes a further antistatic composition according to the invention comprising a styrene-butadiene-acrylonitrile graft blend admixed with a mixed N,N-bis(2-hydroxyethyl) alkylamine and a polypropylene glycol of molecular weight 1,500.

A resin composition is made by the blending and extrusion procedure of example 1, the composition containing 2 percent by weight, based on the copolymer, of a mixture of N,N-bis(2-hydroxyethyl) $C_6$ to $C_{18}$ alkyl-amines derived from coconut oil and 0.5 percent by weight, based on the copolymer, of polypropylene glycol of molecular weight 1,500.

The plaques are molded at a temperature of 185° to 190° C. using a pressure of 19 tons. The plaques are allowed to preheat at contact pressure for 2 minutes before the full pressure is applied and held for 2 minutes.

The plaques are allowed to condition in a controlled atmosphere of 74° F., 50 percent relative humidity for at least 24 hours until the residual charge present has decayed to a very low level, and then charged by rubbing 10 times in one direction with a paper tissue. A new tissue is used for each plaque.

After charging, each plaque is transferred to a Faraday Ice-Pail apparatus comprising an insulated cylindrical can connected to an electrometer and surrounded by an earthed cylindrical shield, the apparatus having been calibrated by placing a series of charged of known potential within the can and noting the electrometer deflection. Measurements of the potential of the charge present on each plaque are made at intervals and the plaque under test is kept outside the apparatus except for the few seconds required for each reading. From the values obtained, the decay curve of voltage (on logarithmic scale) versus time (on linear scale) is constructed. The values quoted below from this curve are V1, the voltage remaining after 1 minute, and T½, the time taken for the voltage to fall to half of V1. Normally one duplicate of each material is tested, but if the variation between duplicates is large, then further samples are tested to obtain agreement. The results obtained are as follows:

| Additive | V1 | T½ |
| --- | --- | --- |
| Copolymer containing 2 percent amine and 0.5 percent polypropylene glycol | 2,800 volts | 4 minutes |
| None (control) | 3,000 volts | 720 minutes |

These results demonstrate the superior rapid decay in electrostatic charge associated with compositions of the invention.

EXAMPLE 3

This example describes another antistatic composition according to the invention comprising a styrene-butadiene-acrylonitrile graft blend, an N,N-bis(2-hydroxyethyl) alkylamine mixture and a polypropylene glycol of molecular weight 1,500.

The procedure of example 2 is repeated except that there are used 2 percent by weight, based on the copolymer, of a mixture of N,N-bis(2-hydroxyethyl) alkylamines wherein the alkyl groups are derived from tallow, and 0.5 percent by weight, based on the copolymer, of polypropylene glycol of molecular weight 1,500.

When tested by the method described in example 2, plaques molded from the above material give the following results:

V1 = 3,700 volts
T½ = 12 minutes which represent very good antistatic properties.

EXAMPLES 4 THROUGH 16

In each of the following examples summarized in table 1 below, a particular indicated interpolymer system of monovinyl automatic compound and alkene nitrile is admixed with an amine of formula 1 and with a polyalkylene glycol using the type of preparation indicated.

Thus, when the type of preparation is stated to be "internally" reference is had to the fact that an indicated interpolymer system is dry blended mechanically (as with a so-called Waring Blender) with the indicated amine and with the indicated glycol. To this resulting mixture is added about two parts by weight of very finely divided titanium dioxide pigment. The resulting mixed blend is now extruded into pellets. This pelletized material is then mixed mechanically with a wax as indicated.

Similarly, when the type of preparation is stated to be "externally," the indicated starting materials are uniformly mechanically blended together as in a so-called Waring Blender.

The product blend produced in each example when molded into plaques displays excellent antistatic properties.

In general, as those skilled in the art will appreciate, a dye or pigment can be admixed with product blends of the invention before such are formed into articles of manufacture. The amount of such dye or pigment added is typically less than about four parts by weight (based on total weight of a composition blend of the invention).

TABLE 1

| Example No. | Antistatic preparation | | Formula 1 amine, percent | Polyalkylene glycol, percent | Paraffinic wax,⁶ percent | Blending extrusion temperature (° F.) |
| --- | --- | --- | --- | --- | --- | --- |
| | Interpolymer system type | Type of preparation | | | | |
| 4 | a | Internally | ¹ 2.0 | ³ 0.5 | .05 | 450 |
| 5 | b | do | ¹ 1.5 | ³ 1.0 | | 480 |
| 6 | c | do | ¹ 2.5 | | .05 | 480 |
| 7 | d | do | ¹ 2.0 | ³ 0.5 | .05 | 450 |
| 8 | e | do | ¹ 2.0 | ³ 0.5 | .05 | 450 |
| 9 | a | Externally | ¹ 2.0 | ³ 0.5 | | |
| 10 | d | do | ¹ 2.0 | ³ 0.5 | | |
| 11 | a | Internally | ² 2.0 | ³ 0.5 | .05 | 480 |
| 12 | d | Externally | ² 2.0 | ³ 0.5 | | |
| 13 | b | Internally | ² 2.0 | ⁴ 0.5 | .05 | 480 |
| 14 | c | do | ¹ 1.5 | ⁵ 0.5 | .05 | 480 |
| 15 | a | do | ¹ 2.0 | ⁴ 0.8 | .05 | 480 |
| 16 | d | do | ¹ 2.0 | ⁵ 0.5 | .05 | 480 |

INTERPOLYMER SYSTEM TYPE USED IN TABLE 1 EXAMPLES a. Styrene/acrylonitrile copolymer 75/25 which when injection-molded produces products having the following properties:

T. S. at fail: 11,300 p.s.i.; T. E. at fail: 2.5 percent; Izod Impact: 0.45 ft.-lbs./in. of notch; D. T. U. L. at 264 p.s.i. 204° F.; Specific Gravity: 1.08; Refractive Index: 1.57; Physical form: pellets in a size range of from 1 to 5 mm.

b. Solvent-resistant acrylonitrile/butadiene/styrene system prepared by polymerizing a mixture comprising:

Styrene: 60–80 parts by weight; Acrylonitrile: 20–40 parts by weight; Butadiene: 5–30 parts by weight at 65°–110° C. in the presence of diacyl peroxide catalyst.

Injection-molded and pressure-molded articles made from this polymer have the following properties:

Izod Impact: 2.4 ft.-lbs./in. of notch; T. S. at fail: 6,300 p.s.i.; T. E. at fail: 32.0 percent; T. E. at yield: 2.5 percent; Physical form: crums less than 1 cm.

c. Styrene/acrylonitrile 85/15 is mechanically blended with butadiene/acrylonitrile rubber 80/20 in the proportions 80 parts of the first polymer (SAN)/20 of rubber using rubber milling machine, and subsequently diced. The pellets (about 0.4 inch in diameter) are then injection-molded to get products having the following mechanical properties:

T. S. at fail: 5,185 p.s.i.; T. E. at fail: 52 percent; Izod Impact Strength: 2.1 ft.-lbs./in. of notch; D. T. Y. L. at 264 p.s.i. 79° C.; Mold-filling temperature: 185° C.; Flexural modulus: 320,000 p.s.i.

d. A preformed butadiene rubber is introduced (10–40 parts) into a kettle where styrene monomer (60–40 parts) acrylonitrile monomer (15–30 parts) thereafter are introduced. Graft polymerization is carried out at about 130° C. for about 2 hours in the presence of suspending agents. The polymer obtained when injection-molded has the following properties:

T. S. at fail: 5,500 p.s.i.; T. E. at fail: 70 percent; Tensile modulus: 250,000 p.s.i.; Izod Impact strength: 4.1 ft.-lbs./in. of notch; D. T. U. L. at 264 p.s.i. ½×½ inch bars 73° C.; Physical form: beads ranging in size up to about 5 mm.

e. Mixture of type (a) and (c) above as such. The styrene/acrylonitrile 75/25 is blended (60–40) with the diced concentrate type C mechanically using an extruder at 500° F. The pellets obtained are injection-molded to get products having the following properties:

T. S. at fail: 6,000 p.s.i.; T. E. at fail: 16.2 percent; D. T. U. L. at 264 p.s.i. on ½×½ inch bars 81° C.; Flexural modulus: 410,000 p.s.i.; Izod impact strength: 1.10 ft.-lbs./in. of notch; Physical form: pellets from 1 mm. to 5 mm. range.

TABLE 1 FOOTNOTES (1) This amine is available commercially under the trade designation Ethomeen C/12 from Armour & Company.

Source: coco amine.

Average molecular weight: 285.

Mols of ethylene oxide (x+y)=2 (referring to formula 1).

Specific gravity: 25°/25° C. is 0.874.

Color gardner 11.

Appearance at 25° C. is liquid.

(2) This product is available commercially under the trade designation

Antistat 273 C from Armour & Company.

Molecular weight: 280 to 310.

Compound name: N,N-bis(2-hydroxyethyl)alkyl($C_{12}$–$C_{18}$)amine.

(3) This is a polypropylene glycol having a molecular weight of about 2,000.

(4) This is a polyethylene glycol having a molecular weight of about 400.

(5) This is a mixture of the polypropylene glycol of footnote (3) and the polyethylene glycol of footnote (4) in the ratio of about 60 to 40 (by weight).

(6) This wax is the condensation product of a diamine and a dibasic carboxylic acid available commercially under the trade designation Acrawax C from Glyco Chemicals, Division of Chas. L. Huisking & Company, New York.

What is claimed is:

1. An antistatic thermoplastic polymer composition comprising a. an interpolymer system of monovinyl aromatic compound and alkene nitrile compound, said interpolymer system being selected from the group consisting of 1. interpolymers formed by polymerizing a monovinyl aromatic compound with an alkene nitrile compound;
    2. interpolymers formed by polymerizing a monovinyl aromatic compound, an alkene nitrile compound, and a conjugated alkadiene monomer;
    3. mechanical blends of (1) or (2) or mixtures of (1) and (2) with a preformed diene polymer rubber produced by polymerizing at least one conjugated alkadiene monomer, optionally in the presence of a monovinyl aromatic compound or an alkene nitrile or a mixture of a monovinyl aromatic compound and an alkene nitrile;
    4. graft blends of (1) or (2) or mixtures of (1) and (2) produced by polymerizing the monomers used to make such interpolymers in the presence of a preformed diene polymer as characterized in (3) above; and
    5. mixtures of at least two of the foregoing; said monovinyl aromatic compound being selected from the group consisting of styrene, alkyl-substituted styrenes, halogen substituted styrenes, mixed halogen plus alkyl-substituted styrenes, vinyl naphthalene, vinyl anthracene and mixtures of the foregoing; said alkene nitrile compound being selected from the group consisting of acrylonitrile, methacrylonitrile, ethacrylonitrile and mixtures thereof;

b. at least one amine of the formula

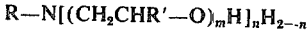

where,

R is a monovalent aliphatic hydrocarbon group containing from about six through 22 carbon atoms, R' is selected from the group consisting of hydrogen and methyl, $m$ is an integer of from one through eight, $n$ is the integer 1 or 2, and c. polypropylene glycol having a molecular weight of from 100 through 10,000, and d. said composition containing from about 0.001 to 30 parts by weight of said amine, from about 0.001 to 10 parts by weight of said polypropylene glycol with the balance up to 100 weight percent being said interpolymer system in any given composition.

2. A composition according to claim 1 in which said alkene nitrile compound is acrylonitrile.

3. A composition according to claim 2 in which said vinyl aromatic compound is styrene.

4. A composition according to claim 1 in which the conjugated alkadiene is butadiene.

5. A composition according to claim 1 in which in the formula of the amine antistatic additive the group R contains from eight to 18 carbon atoms.

6. A composition according to claim 5 in which R is derived from a coconut oil.

7. A composition according to claim 1 in which R' is hydrogen, $m$ is 1 and $n$ is 2.

8. A composition according to claim 1 in which the amount of amine present is between about 0.5 and 4 percent.

9. A composition according to claim 1 in which the polypropylene glycol has a molecular weight between 100 and 5,000.

10. A composition according to claim 1 in which the amount of polypropylene glycol present is between about 0.1 and 0.8 percent.

11. A composition of claim 1 containing in addition up to about 4 weight percent of a pigment or dye.

* * * * *

PO-1050
(5/69)

UNITED STATES PATENT OFFICE
CERTIFICATE OF CORRECTION

Patent No. 3,625,915                    Dated December 7, 1971

Inventor(s)  MICHEL GUBLER AND JOSEPH GUILLON

It is certified that error appears in the above-identified patent and that said Letters Patent are hereby corrected as shown below:

Column 3, line 17, before the word "ethylstyrenes", cancel the prefix "ar".

Signed and sealed this 5th day of September 1972.

(SEAL)
Attest:

EDWARD M. FLETCHER, JR.                ROBERT GOTTSCHALK
Attesting Officer                      Commissioner of Patents